United States Patent [19]
Godfrey

[11]* 3,723,338
[45] Mar. 27, 1973

[54] METHOD OF REDUCING THE RELEASE OF MOBILE CONTAMINANTS FROM GRANULAR SOLIDS

[75] Inventor: Wesley L. Godfrey, Pasco, Wash.
[73] Assignee: The United States of America as represented by the United States Atomic Energy Commission
[22] Filed: Apr. 28, 1971
[21] Appl. No.: 138,371

[52] U.S. Cl. ........252/301.1 W, 252/301.1 R, 264/.5
[51] Int. Cl. ................................................C09k 3/00
[58] Field of Search ....252/301.1 W, 301.1 R; 264/.5

[56] References Cited

UNITED STATES PATENTS

| 3,371,712 | 3/1968 | Adams | 166/33 |
| 3,367,992 | 2/1968 | Bearden | 260/837 |
| 3,277,607 | 10/1966 | Overstreet | 252/301.1 X |
| 3,558,750 | 1/1971 | Davis et al. | 264/.5 |

OTHER PUBLICATIONS

"Improvement in Process for Injecting Radioactive Residues into the Soil." Nuc. Sci. Abs., Vol. 23, No. 18, 1969, No. 35,323, p. 3,625.

McClain et al., "Stains of Investigations of Salt Formations for Disposal of Highly Radioactive," Nuc. Sci. Abs., Vol. 24, No. 8, 1970, No. 14,236, p. 1,412.

Primary Examiner—Carl D. Quarforth
Assistant Examiner—R. L. Tate
Attorney—Roland A. Anderson

[57] ABSTRACT

Granular solids, particularly soil and like solids, containing mobile contaminants, as for example sorbed ionic species, are injected with a hardenable liquid, as for example a thermosetting resin, to fill the interstitial voids and enclose the individual particles. In an important specific embodiment, soil containing radioactive species and particularly soil containing $^{90}Sr$ and $^{137}Cs$ is injected with a thermosettable composition comprising a dicarboxylic acid anhydride partial ester mixed with a polymerizable monomer and, preferably, also a polyfunctional material such as polyepoxide, and allowed to polymerize with or without curing agents whereby the composition polymerizes around particles of the soil and immobilizes the radioactive material.

6 Claims, No Drawings

1

METHOD OF REDUCING THE RELEASE OF MOBILE CONTAMINANTS FROM GRANULAR SOLIDS

CONTRACTUAL ORIGIN OF THE INVENTION

The invention described herein was made in the course of, or under, a contract with the United States Atomic Energy Commission.

BACKGROUND OF THE INVENTION

The invention relates to a method of reducing the release of mobile contaminants from granular solids.

The granular solids of particular interest are any inert sorption medium of which soil is the preferred material.

The mobile contaminants include sorbed ionic species, including soluble salts or a sorbed species on an inert matrix. Cesium represents the species "leachable ionic species" and the salts such as NaCl, $Na_2CO_3$, $NaNO_2$, $NaNO_3$ and NaOH are intended to represent the species "soluble ionic species".

The mobile contaminants of particular concern are those which are radioactive, including $^{90}Sr$ and $^{137}Cs$.

More particularly the invention relates to a process of immobilizing radioactive material in soil. The term "soil" as used herein is defined as a heterogeneous, polydisperse system of solid, liquid and gaseous components. The solid component is made up of primary minerals, clay minerals and hydrous oxides, together with organic matter and living organisms. Soil clays are composed primarily of colloidal size particles of crystalline clay materials, and also contain amorphous gel particles. It is in soil of the above definition that some of the low-level radioactive wastes on the Hanford reservation are stored. These soils effectively act both as a filter and a chemically reactive media to retain the long-lived radionuclides, $^{90}Sr$ and $^{137}Cs$.

The very long period (several centuries) required for decay of $^{90}Sr$ and $^{137}Cs$ does, however, make prudent the discovery of alternate methods which may provide additional assurance that the wastes remain isolated from the environment. Fixation of the radioactive salt and soil in situ provides an attractive alternate.

Prior to this invention soils, sands and like granular materials have been injected with polymerizable liquids to produce water impregnable masses of high strength as shown in U.S. Pat. No. 3,371,712, but such treatments have not been used with soils or other granular material containing leachable contaminants such as radioactive species. Also, fixation of radioactive contaminants in soil has been carried out by applying a thin layer of an organo silicone to radionuclide contaminated land surfaces as shown in U.S. Pat. No. 3,277,607, but such surface layers do not give adequate protection over an extended period of time and do not prevent the release of the radioactive material by leaching from the interior of the soil.

SUMMARY OF THE INVENTION

Attempts were made by us to immobilize radioactive materials in soil by injecting various organic monomers into radioactive soil and salt cakes and subsequently polymerizing the monomers to reduce the leachability or mobility of the radioactivity contained therein. Reduction in leachability was obtained by injecting hardenable liquids, including alkyd resins, epoxy resins, acrylate, styrene and the thermosettable composition of the acrylate dicarboxylic acid anhydride partial esters mixed with a polymerizable monomer such as styrene and a polyfunctional material such as a polyepoxide, in soil containing leachable contaminants. The acrylate dicarboxylic acid anhydride partial ester thermosettable compositions were found to give results of practical value when injected in substantially dry soil substantially free from soluble salts. Salt cake or soil containing large quantities of salt and wet soil when injected with many hardenable liquids gave poor results, although there was a substantial reduction of the release of salts from dry soil containing salts when the soil was injected with thermosetting resins, such as alkyd resins and epoxy resins.

The invention in its broadest aspect therefore comprises mixing by injection or otherwise, a hardenable liquid, as for example a thermosetting resin into a mass of granular solids containing mobile contaminants to fill the interstitial voids, and then solidifying the liquid so as to enclose the individual particles in a solid mass.

Types of solidifiable liquids which reduce the release of mobile contaminants include the alkyd resins of which the product sold under the trademark Polylite 31-007 is an example.

Condensation products of epichlorhydrin and bisphenol-A, of which the product sold under the trademark Epon 815 is an example; styrene and/or divinyl benzene, concrete, asphalt, and the thermosettable resin compositions which are mixtures of A. a resin containing terminal vinylidene groups prepared by reacting (1) a polyfunctional material selected from the group consisting of polyepoxides, polyisocyanates and polyamines in essentially equivalent amounts with (2) a dicarboxylic acid partial ester having the formula

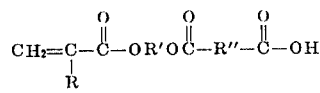

wherein R is hydrogen or methyl, R' is an organic radical containing from two to six carbon atoms of which at least two extend in a chain between the adjoining oxygens, and R'' is a saturated aliphatic group, or an unsaturated aliphatic group,

where X is a halogen or an aromatic group; and

B. a polymerizable ethylenically unsaturated compound. Preferably R' is —$CH_2CH_2$— or

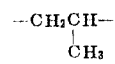

and the polymerizable monomer is an alkyl ester of acrylic or methacrylic acid.

Also, similar thermosettable compositions can be made and are suitable in this invention in which the polyfunctional material is omitted.

The partial ester thermosetting compositions of the above type, of which Derakane-118 is the preferred product, are described in Bearden U.S. Pat. No. 3,367,992. See, for example, Example 1 which shows a half ester obtained by condensing maleic anhydride with 2-hydroxyethyl acrylate. This was mixed with styrene and 1 percent by weight of methylethyl ketone peroxide and 0.3 percent by weight of cobalt naphthenate and allowed to stand at room temperature for 16 hours to give the solid resin. Other suitable specific partial ester thermosettable compositions and curing agents are shown in the other examples.

In accordance with one of the important aspects of this invention, which is illustrative of the generic invention, dry soil containing mobile contaminants including $^{90}$Sr and $^{137}$Cs is injected with one of the above partial ester thermosettable compositions mixed with a curing agent. Such materials more specifically may be described as a partial ester of 2-hydroxyalkyl acrylate or methacrylate and a dicarboxylic acid anhydride mixed with a polymerizable monomer and also, desirably but not necessarily, a polyfunctional material such as a polyepoxide, polyisocyanate or a polyamine. These compositions solidify on standing with or without heat, and with or without curing agents.

DETAILED DESCRIPTION OF THE PREFERRED EMBODIMENTS

The injection of Derakane-118 into soil was evaluated in the laboratory and in the field. Derakane-118 was selected on the basis of its relatively low viscosity and slow gel time when mixed with soil. Laboratory studies showed that Derakane-118 gels in about 15 minutes with 3 times the standard initiator and promotor concentrations but the gel time is delayed for several hours when mixed with normal soil. A soil column was prepared to evaluate the flow of the standard Derakane 118 formulation (1 percent methylethyl ketone peroxide and 0.1 percent cobalt naphthenate) through dry packed soil. The soil was contained in a 1.9 cm ID glass tube and the resin was pumped upflow into the soil with a peristaltic pump at a pressure of 60 psig. The rate of resin flow through the soil became quite slow after 3 traveling inches. The pump was stopped after the resin had flowed 8 inches ($\approx$ 15 minutes) in the soil column and the column was allowed to set overnight to cure. The lower 4 inches of the resin-soil column was darker in color similar to that obtained in batch mixing where the soil is saturated with resin. The upper 4 inches was lighter in color and assumed to be unsaturated. Sections were cut from the column. One section showed the lighter unsaturated zone. The density of the darker zone was 2.09 g/cc and that of the lighter zone 1.96 g/cc.

The standard Derakane-118 formulation was also pumped through a 2-inch diameter soil column with a positive displacement pump at pressures up to 400 psig. The resin flowed 42 inches in 13 minutes at which point the pump was shut down due to rupture of the glass pipe containing the soil. The lower 26 inches of resin soil mixture hardened in 2 days but the upper 16 inches failed to set which represents some loss of resin due to unsaturation.

An injection experiment was conducted in the laboratory with the standard Derakane-118 formulation and normal soil contained in a 15 gallon can. The resin was injected into the soil through a 3/8 inch steel tube which was perforated at one end. The perforated end was inserted 15 inches below the surface of the soil and ninety pounds of lead bricks were placed on the soil surface to prevent expansion of the soil. Resin was pumped into the soil at a flow rate of 500 ml/min until 3,400 ml were injected. The resin-soil mass was allowed to set for 2 days. A hard resin-soil mixture was obtained which weighed 7.81 Kg and had an average density of 1.87 g/cc. Less than half of the resin was recovered in the hard resin-soil mass. The remainder was lost largely as a result of unsaturation.

A field test was carried out using Derakane 118 containing 3 times the standard initiator and promoter concentration. A steel pipe with a well point was prepared and perforated at the 5-foot level. The pipe was hammered into the soil and connected to a positive displacement pump. On the first attempted injection the resin surfaced around the pipe after about one gallon of resin was pumped into the soil. After flushing the pipe with uncatalyzed resin, it was driven down to the 7-foot level for a second attempt. Resin was poured around the pipe at the surface in order to form a seal. This resin layer was allowed to harden and then 11.5 gallons of resin was injected through the pipe at a flow rate of 0.13 gal/min.

Four days after injection, the resin-soil mixture was excavated and was found to be solidified into a hard mass. The resin did not spread evenly from the injection point. The resin appeared to follow an old root system. The total volume of the resin-soil mass was 3.2 cu ft and the weight was 395 lbs. It is estimated that 70 percent of the resin injected was recovered in the mass. The average compressive strength was 5,300 psi.

The complete disclosure of U.S. Pat. No. 3,367,992 is hereby incorporated by reference.

The embodiments of the invention in which an exclusive property or privilege is claimed are defined as follows:

1. The method of reducing the release of mobile contaminants including radioactive species $^{90}$Sr and $^{137}$Cs from soil containing such contaminants comprising injecting a hardenable liquid into the soil to fill the interstitial voids and enclose the individual soil particles, said hardenable liquid consisting essentially of a thermosetting resin composition selected from the group consisting of alkyd resins, epoxy resins and a mixture of A. a resin containing terminal vinylidene groups prepared from a dicarboxylic acid partial ester having the formula

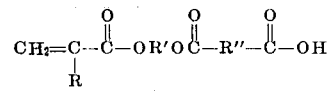

wherein R is hydrogen or methyl, R' is an organic radical containing from two to six carbon atoms of which at least two extend in a chain between the adjoining oxygens, and R'' is a saturated aliphatic group, or an unsaturated aliphatic group

where X is halogen or an aromatic group; and

B. a polymerizable ethylenically unsaturated compound.

2. The method of claim 1 wherein the resin composition is the mixture of A and B and A is the reaction product of said dicarboxylic acid partial ester and an equivalent of a polyfunctional material selected from the group consisting of polyepoxides, polyisocyanates and polyamines.

3. The method of claim 1 wherein the resin composition is the mixture of A and B and R' is —CH$_2$CH$_2$— or

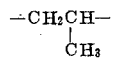

4. The method of claim 3 wherein the composition is mixed with a curing agent and an accelerating agent.

5. The method of claim 4 wherein the curing agent is methylethyl ketone peroxide and the accelerating agent is cobalt naphthenate.

6. The method of claim 1 wherein the injection is made in substantially dry soil substantially free from water soluble salts and the resin composition is a partial ester of a 2-hydroxyalkyl acrylate or methacrylate and a dicarboxylic acid anhydride mixed with a polymerizable ethylenically unsaturated compound.

* * * * *